(12) United States Patent
Chamberlain et al.

(10) Patent No.: US 12,386,205 B1
(45) Date of Patent: Aug. 12, 2025

(54) FILMS HAVING ASYMMETRIC GRIN OPTICAL ELEMENTS FOR APPLICATION TO SPECTACLES OR OTHER OPHTHALMIC LENSES

(71) Applicant: CooperVision International Limited, Fareham (GB)

(72) Inventors: Paul Chamberlain, Livermore, CA (US); Sourav Saha, Pleasanton, CA (US); Arthur Bradley, Bloomington, IN (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/997,519

(22) PCT Filed: Oct. 23, 2023

(86) PCT No.: PCT/GB2023/052761
§ 371 (c)(1),
(2) Date: Jan. 22, 2025

(87) PCT Pub. No.: WO2024/089399
PCT Pub. Date: May 2, 2024

Related U.S. Application Data

(60) Provisional application No. 63/420,144, filed on Oct. 28, 2022.

(51) Int. Cl.
*G02C 7/08* (2006.01)
*G02B 1/12* (2006.01)
(Continued)

(52) U.S. Cl.
CPC ............... *G02C 7/086* (2013.01); *G02B 1/12* (2013.01); *G02B 1/14* (2015.01); *G02C 7/022* (2013.01);
(Continued)

(58) Field of Classification Search
CPC .... G02C 7/086; G02C 7/022; G02C 2202/12; G02C 2202/24; G02B 1/12; G02B 1/14
(Continued)

(56) References Cited

U.S. PATENT DOCUMENTS 8,111,463 B2    2/2012  Endle et al.
11,366,339 B2   6/2022  Kubota et al.
(Continued)

FOREIGN PATENT DOCUMENTS

CN    101019059 A    8/2007
EP    3575859 A1     12/2019
(Continued)

OTHER PUBLICATIONS

International Search Report and Written Opinion issued in corresponding International Patent Application No. PCT/GB2023/052761 mailed Feb. 13, 2024 (15 pages).
(Continued)

*Primary Examiner* — William R Alexander
(74) *Attorney, Agent, or Firm* — Kilyk & Bowersox, P.L.L.C.

(57) ABSTRACT

A film (1), an ophthalmic lens including a film (1), spectacles comprising an ophthalmic lens including a film (1), and a method of manufacturing a film (1) are described. The film (1) has a base refractive index and includes at least one gradient index optical element (7a, 7b) having an asymmetric refractive index profile.

21 Claims, 11 Drawing Sheets

(51) Int. Cl.
*G02B 1/14* (2015.01)
*G02C 7/02* (2006.01)

(52) U.S. Cl.
CPC ..... *G02C 2202/12* (2013.01); *G02C 2202/24* (2013.01)

(58) Field of Classification Search
USPC .......................................................... 351/57
See application file for complete search history.

(56) References Cited

U.S. PATENT DOCUMENTS

| | | | |
|---|---|---|---|
| 2005/0105191 A1 | 5/2005 | Baer et al. | |
| 2005/0219691 A1 | 10/2005 | Chubachi et al. | |
| 2014/0104563 A1* | 4/2014 | Bakaraju | G02B 27/0018 351/159.52 |
| 2016/0377886 A1* | 12/2016 | Quiroga | B29D 11/00009 351/159.73 |
| 2019/0235279 A1* | 8/2019 | Hones | B29D 11/00326 |
| 2020/0073147 A1 | 3/2020 | Bakaraju et al. | |
| 2021/0165244 A1* | 6/2021 | Hones | G02C 7/165 |
| 2021/0382326 A1* | 12/2021 | Kubota | G02C 7/083 |
| 2021/0389607 A1 | 12/2021 | Buscemi et al. | |
| 2022/0218520 A1* | 7/2022 | Back | G02C 7/022 |
| 2023/0176399 A1* | 6/2023 | Bakaraju | G02C 9/00 351/159.69 |
| 2025/0110354 A1* | 4/2025 | Chamberlain | G02C 7/086 |

FOREIGN PATENT DOCUMENTS

| | | |
|---|---|---|
| WO | 2012166696 A1 | 12/2012 |
| WO | 2015173797 A1 | 11/2015 |
| WO | 2022068607 A1 | 4/2022 |

OTHER PUBLICATIONS

Office Action issued in corresponding Taiwan Patent Application No. 112141189 issued Apr. 3, 2024 (8 pages).
PCT Demand filed Aug. 22, 2024 in corresponding International Patent Application No. PCT/GB2023/052761 (23 pages).
PCT Notification Concerning Informal Communication issued in corresponding International Patent Application No. PCT/GB2023/052761 mailed Sep. 13, 2024 (3 pages).
Response to Informal Communication filed Sep. 17, 2024 in corresponding International Patent Application No. PCT/GB2023/052761 (10 pages).
International Preliminary Report on Patentability issued in corresponding International Patent Application No. PCT/GB2023/052761 mailed Dec. 3, 2024 (21 pages).

* cited by examiner

107a

107b

107a

107b

FILMS HAVING ASYMMETRIC GRIN OPTICAL ELEMENTS FOR APPLICATION TO SPECTACLES OR OTHER OPHTHALMIC LENSES

This application is a National Stage Application of PCT/GB2023/052761, filed Oct. 23, 2023, which claims priority to U.S. Patent Application No. 63/420,144, filed Oct. 28, 2022.

The present disclosure concerns films including at least one gradient index optical element having an asymmetric refractive index profile, for applying to ophthalmic lenses. The disclosure also concerns ophthalmic lenses including such films, and methods of manufacturing such films.

BACKGROUND

Many people, including children and adults require ophthalmic lenses to correct for myopia (short-sightedness), and many adults require ophthalmic lenses to correct for presbyopia (an age-related inability to accommodate and hence inability to focus on near objects). Ophthalmic lenses may also be required to correct for hyperopia (far-sightedness), astigmatism, or keratoconus (a condition whereby the cornea gradually bulges to form a cone shape).

Without optical correction myopic eyes focus incoming light from distant objects to a location in front of the retina. Consequently, the light converges towards a plane in front of the retina beyond which it then diverges, and is out of focus upon arrival at, the retina. Conventional lenses (e.g., spectacle lenses and contact lenses) for correcting myopia reduce the convergence (for contact lenses), or cause divergence (for spectacle lenses) of incoming light from distant objects before it reaches the eye, so that the location of the focus is shifted onto the retina.

In a presbyopic eye, the crystalline lens does not change shape effectively to accommodate for near objects, and therefore people with presbyopia cannot focus on near objects. Conventional lenses (e.g., spectacle lenses and contact lenses) for correcting presbyopia include bifocal or progressive lenses, which include regions that are optimised for near vision and regions that are optimised for distance vision. Presbyopia may also be treated using bifocal or multifocal lenses, or monovision lenses (wherein different prescription are provided for each eye, one eye being provided with a distance vision lens, and one eye being provided with a near vision lens).

It was suggested several decades ago that progression of myopia in children or young people could be slowed or prevented by under-correcting, i.e., moving the focus towards but not quite onto the retina. However, that approach necessarily results in degraded distance vision compared with the vision obtained with a lens that fully corrects for myopia. Moreover, it is now regarded as doubtful that under-correction is effective in controlling developing myopia. A more recent approach is to provide lenses having both regions that provide full correction of distance vision and regions that under-correct, or deliberately induce, myopic defocus. Lenses may also be provided that increase scattering of light in certain regions, compared to light passing through the fully correcting region of the lens. It has been suggested that these approaches can prevent or slow down the development or progression of myopia in children or young people, whilst providing good distance vision.

In the case of lenses having a region that provide defocus, the regions that provide full-correction of distance vision are usually referred to as base power regions and the regions that provide under-correction or deliberately induce myopic defocus are usually referred to as add power regions or myopic defocus regions (because the dioptric power is more positive, or less negative, than the power of the distance correcting base power regions). A surface (typically the anterior surface) of the add power region(s) has a smaller radius of curvature than that of the distance power region(s) and therefore provides a more positive or less negative power to the eye. The add power region(s) are designed to focus incoming parallel light (i.e., light from a distance) within the eye in front of the retina (i.e., closer to the lens), whilst the distance power region(s) are designed to focus light and form an image at the retina (i.e., further away from the lens). When a lens wearer is viewing near targets and using accommodation to focus light that passes through the distance power region(s), the add power region(s) will focus light in front of the retina.

In the case of lenses that increase scattering of light in a certain region, features that increase scattering may be introduced into a lens surface or may be introduced into the material that is used to form the lens. For example, scattering elements may be generated by thermal or mechanical or photo-induction methods into the lens surface, or embedded in the lens. Scattering elements may, for example, be laser induced material changes to form optical elements embedded in the lens material.

A known type of contact lens that reduces the progression of myopia is a dual-focus contact lens, available under the name of MISIGHT (CooperVision, Inc.). This dual-focus lens is different than bifocal or multifocal contact lenses configured to improve the vision of presbyopes, in that the dual-focus lens is configured with certain optical dimensions to enable a person who is able to accommodate to use the distance correction (i.e., the base power) for viewing both distant objects and near objects. The treatment zones of the dual-focus lens that have the add power also provide a myopically defocused image at both distant and near viewing distances.

Whilst these lenses have been found to be beneficial in preventing or slowing down the development or progression of myopia, annular add power regions can give rise to unwanted visual side effects. Light that is focused by the annular add power regions in front of the retina diverges from the focus to form a defocused annulus at the retina. Wearers of these lenses therefore may see a ring or 'halo' surrounding images that are formed on the retina, particularly for small bright objects such as street lights and car headlights. Also, rather than using the natural accommodation of the eye (i.e., the eye's natural ability to change focal length) to bring nearby objects into focus, in theory, wearers could make use of the additional annular add power region to focus near objects; in other words, wearers can inadvertently use the lenses in the same manner as presbyopia correction lenses are used, which is undesirable for young subjects.

Further lenses have been developed which can be used in the treatment of myopia. In these lenses, the annular region is configured such that no single, on-axis image is formed in front of the retina, thereby preventing such an image from being used to focus near targets and avoid the need for the eye to accommodate. Rather, distant point light sources are imaged by the annular region to a ring-shaped focal line at a near add power focal surface, leading to a small spot size of light, without a surrounding 'halo' effect, on the retina at a distance focal surface.

For treating myopia, it is recognised that it may be beneficial to provide a lens that introduces additional myopic defocus. For treating presbyopia, it may be beneficial to provide a lens that gives rise to an extended depth of focus.

It has been recognised that known lenses that include treatment portions for introducing defocus are typically designed to provide a specific treatment to a lens wearer. The lenses may be expensive and complex in design, and over time, if the lens wearer's requirements change, they may need to purchase different lenses providing different levels of correction.

The present invention seeks to provide a simple and cost effective alternative to known lenses for use in preventing or slowing of the worsening of myopia. Such lenses may also be beneficial in correcting or improving vision associated with presbyopia, hyperopia, astigmatism, keratoconus or other refractive anomalies.

SUMMARY

According to a first aspect, the present disclosure provides a film for applying to an ophthalmic lens as described herein.

According to a second aspect, the present disclosure comprises an ophthalmic lens as described herein.

According to a third aspect, the present disclosure comprises spectacles as described herein.

According to a fourth aspect, the present disclosure comprises a method as described herein.

It will of course be appreciated that features described in relation to one aspect of the present disclosure may be incorporated into other aspects of the present disclosure. For example, the method of the disclosure may incorporate features described with reference to the apparatus of the disclosure and vice versa.

DESCRIPTION OF THE DRAWINGS

Example embodiments will now be described, by way of example only, with reference to the accompanying schematic drawings.

DETAILED DESCRIPTION

Figure 1A:
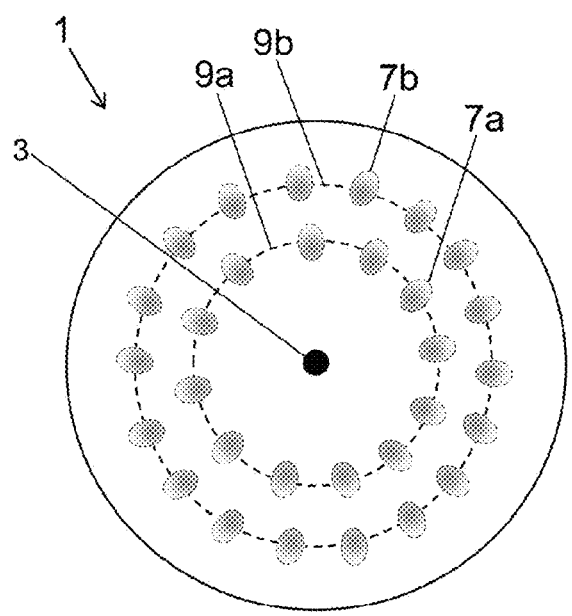
FIG. 1A is a top view of a film according to an embodiment of the present disclosure.

According to a first aspect, the present disclosure provides a film for applying to an ophthalmic lens, wherein the film has a base refractive index and includes at least one gradient index optical element having an asymmetric refractive index profile.

The film may be for use in preventing or slowing the development or progression of myopia. The film may be for use in correcting or improving vision associated with presbyopia, hyperopia, astigmatism, keratoconus or another refractive anomaly.

The film may be a cross-linked polymeric film. The film may be a thin film. The film may have been formed from a matrix of uncross linked polymers. The film may be a Bayfol® HX film. The film may have a uniform thickness.

The base refractive index of the film may be uniform. The base refractive index of the film may be between 1.3 and 1.8, preferably about 1.5. Each of the at least one GRIN optical elements may have an average refractive index that is greater than the base refractive index. Alternatively, each of the at least one GRIN optical elements may have an average refractive index that is less than the base refractive index.

In the context of the present disclosure, each of the at least one GRIN optical elements is an element that has a varying and asymmetric refractive index profile in a plane parallel to a surface of the film. Each element may be substantially cylindrical, or cylindrical with an elliptical or oval cross section, and may have its cylindrical axis perpendicular to the plane of the layer. Each element may be substantially spheroidal or cuboidal. Each element may have a circular, elliptical, oval, or square cross section in a plane that is parallel to a surface of the film. Each element may have a circular, elliptical, oval, or square cross section and a planar surface that lies flush with a surface of the layer. In embodiments of the present disclosure, the variation in refractive index across the at least one GRIN optical element will be asymmetric in at least one transverse direction, i.e., a direction that runs parallel to a surface of the layer.

The asymmetric variation in refractive index may be a radial variation in refractive index, i.e., the refractive index may vary extending radially outwardly from a point at the centre of the GRIN optical element, and in a plane that is parallel to a surface of the film (i.e., a transverse plane). The asymmetric variation in refractive index may be in a circumferential direction, i.e., the refractive index may vary around the circumference of the GRIN element in a plane that is parallel to a surface of the film, and the variation in refractive index may be different along different meridians of the GRIN optical element.

The asymmetric variation in refractive index may be a variation in a linear direction that is parallel to a surface of the film.

Advantageously, the GRIN optical elements may provide defocusing. It is believed that defocusing may help to prevent or slow of the worsening of myopia. It is believed that defocusing may help to correct or improve vision associated with presbyopia, hyperopia, astigmatism, keratoconus or other refractive anomalies. The GRIN optical elements may be arranged such that they provide random refractive index modulations across the film, thereby increasing the spread of light across the retina and lowering image contrast.

The variation in refractive index of any of the at least one GRIN optical elements may be defined by an asymmetric polynomial function.

The film may have a film axis that extends in a direction substantially perpendicular to the plane of the film. If the film has a circular cross-section, the film axis may be at the radial midpoint of the film, or the film axis may be towards the radial midpoint of the film. The film axis may be an optical axis of the film. The optical axis of the film may be defined with reference to a distant point source of light that is on the optical axis of the film. Light from a distant point source that is on the optical axis of the film, and that passes through a region of the film having the base refractive index, will be focused to a point on the optical axis of the film. As a result of the asymmetric refractive index profile of the GRIN optical elements, light from a distant point source on the optical axis of the film that passes through one of the GRIN optical elements of the film having the base refractive index will be focused towards a point that is a first distance from the optical axis of the film. Incoming light from a distant point source that falls incident on the at least one gradient index optical elements, in a direction substantially normal to the plane of the film, is therefore focused in a direction that is not normal to the plane of the film.

Each of the at least one GRIN optical elements is a lens having its own local optical axis. The local optical axis of each of the at least one GRIN optical elements is tilted relative to the optical axis of the film, as a result of the asymmetric refractive index profile. The local optical axis of each of the at least one GRIN optical elements is defined with reference to a distant point source of light. Light from a distant point source that is on the local optical axis of a GRIN optical element (which may hereafter be referred to as an on-axis distant point source) will be focused onto the local optical axis of that GRIN optical element. A GRIN optical element with an asymmetric variation in refractive index in a direction parallel to a surface of the film (i.e., a transverse direction) will have a local optical axis that is tilted relative to the optical axis of the lens, and as a result, light from a distant point source on the optical axis of the film that passes through each of the GRIN optical elements will be focused to a point that is a first distance from the optical axis of the film. The focal power of each of the GRIN optical elements will be dependent upon the refractive index profile of that GRIN optical element.

The film may be configurable on a surface of an ophthalmic lens (which may hereafter be referred to as a lens). Such a lens may be may be a lens for preventing or slowing the development or progression of myopia. The lens may be a lens for correcting or improving vision associated with presbyopia, hyperopia, astigmatism, keratoconus or another refractive anomaly.

An ophthalmic lens will have an optical axis. When a film according to embodiments of the present disclosure is applied to an ophthalmic lens, the optical axis of the lens-film assembly may be influenced by the optical properties of the film. Hereafter, where reference is made to a film when it has been applied to a lens, and where reference is made to the optical axis of that lens, the optical axis will be the optical axis of the lens when taken in combination with the film.

The film may be configurable on a surface of a lens, such that light from a distant point source on the optical axis of the lens that passes through a region of the film having the base refractive index is focused towards a point on the optical axis of the lens, and light from a distant point source on the optical axis of the lens that passes through the at least one gradient index optical element is focused towards a point that is a first distance from the optical axis.

The optical axis of the lens is defined with reference to a distant point source of light. Light from a distant point source that is on the optical axis of the lens (which may hereafter be referred to as an on-axis distant point source) will be focused onto the optical axis of the lens. The optical axis may lie along the centreline of the lens. For example, where the lens is a contact lens, the optical axis generally lies along the centreline of the lens. However, the optical axis may of course not lie along the centreline of the lens; this may be the case in a spectacle lens, where the position of the optical axis of the lens will be determined by the interpupillary distance of the wearer, which, depending on the lens geometry, may not coincide with the centreline of the lens.

When the film is applied to the lens, light from an on-axis distant point source passing through a region of the film having the base refractive index may be focused to a focal point on the optical axis of the lens, at a base power focal surface. A base power focal surface can be defined as a surface that is perpendicular to the optical axis of the lens and that passes through the focal point of the lens. The term surface, as used herein, does not refer to a physical surface, but to a surface that could be drawn through points where light from distant objects would be focused. Such a surface is also referred to as an image plane (even though it can be a curved surface) or image shell. The eye focuses light onto the retina which is curved, and in a perfectly focused eye, the curvature of the image shell would match the curvature of the retina. Therefore, the eye does not focus light onto a flat mathematical plane. However, in the art, the curved surface of the retina is commonly referred to as a plane. When the film is applied to a lens, light from an on-axis point source that passes through the film is focused to a focal point on the optical axis of the lens, at the base power focal surface. As a result of the asymmetric refractive index profile, when the film is applied to the lens, light passing from an on-axis distant point source that passes through the at least one GRIN optical element will be directed towards a point that is not on the optical axis of the lens (i.e., an off-axis focal point).

When the film is applied to the lens, the local optical axis of each of the at least one GRIN optical elements is tilted relative to the optical axis of the lens, as a result of the asymmetric refractive index profile. A GRIN optical element with an asymmetric variation in refractive index in a direction parallel to a surface of the film (i.e., a transverse direction) will have a local optical axis that is tilted relative to the optical axis of the lens, and as a result, light from an on-axis distant point source passing through each of the GRIN optical elements will be focused to a point that is a first distance from the optical axis of the lens. The focal power of each of the GRIN optical elements will be dependent upon the refractive index profile of that GRIN optical element.

Any or all of the at least one GRIN optical elements may be configured such that when the film is applied to a lens, a light ray from an on-axis distant point source passing through the GRIN optical element forms a small spot of light centred on the optical axis of the lens, at the base power focal surface. Therefore, although each of the GRIN optical elements may focus light towards an off-axis focal point, approximate superposition of an image formed from light passing through the regions of the lens having the base refractive index and defocused images formed from light passing through the GRIN optical elements may improve the quality or contrast of an image formed at the retina, and may improve the vision of the lens wearer. Alternatively, any or all of the at least one GRIN optical elements may be configured such that when the film is applied to the lens, light from an on-axis distant point source passing through the GRIN optical element does not intersect the optical axis of the lens at the base power focal surface. This may lead to contrast reduction or a reduction in image quality of an image formed at the retina, which may be advantageous in reducing myopia progression.

The film may include a plurality of the GRIN optical elements. The film may include a plurality of the GRIN elements distributed randomly across the film. A plurality of the GRIN elements may be distributed randomly across a portion of the film. The film may include a plurality of the GRIN optical elements arranged to form at least one annular ring. The at least one annular ring may be circular, oval, or elliptical in shape. The at least one annular ring may be centred on the film axis, wherein the film axis extends in a direction substantially perpendicular to the plane of the film. When the film is applied to a lens, the film may be configured such that the at least one annular ring is centred on the optical axis of the lens. The film may comprise at least two concentric annular rings positioned at different radial distances from the film axis. The film may be configurable on a lens such that a plurality of the GRIN optical elements may be arranged to form at least two concentric annular rings positioned at different radial distances from the optical axis of the lens.

The GRIN optical elements may be positioned at regular intervals across the whole film or a portion of the film. The GRIN optical elements may be arranged on lattice points of a triangular lattice. The GRIN optical elements may be arranged on lattice points of a square or rectangular lattice.

The GRIN optical elements may be arranged to form an annular pattern on the film. The annular pattern may leave a central region of the film free from GRIN optical elements. The film may have a central region with a diameter of up to 8 mm that is free from the GRIN optical elements. When the film is applied to a lens, the film may be configured such that the annular pattern leaves a central region of the lens free from the GRIN optical elements. The lens may have a central region with a diameter of up to 8 mm that is free from the GRIN optical elements. The annular pattern may comprise a single annulus or a plurality of concentric annuli.

The film may include at least one second annular ring of the GRIN optical elements. The second annular ring of optical elements may be positioned at a different radial distance from the film axis. When the film is applied to a lens, the film may be configured such that the second annular ring of optical elements is a second, different radial distance from the film axis.

At least two of the GRIN optical elements may be substantially identical, i.e., they may be of the same size and shape, and they may have the same asymmetric refractive index profile.

When the film is applied to a lens, the at least two GRIN optical elements may focus light from an on-axis distant point source towards points that are not on the optical axis of the lens, and that lie on the same focal surface. The refractive index profile of the at least two GRIN elements may vary such that, when a lens comprising the film is positioned on an eye, light from an on-axis distant point source passing through the GRIN optical elements will be at a surface that is closer to the posterior surface of the lens than the base power focal surface. The refractive index profile of the at least two GRIN elements may vary such that, when a lens comprising the film is positioned on an eye, light from an on-axis distant point source passing through the GRIN optical elements will be focused at a surface that is further away from the posterior surface of the lens than the base power focal surface.

Substantially identical GRIN optical elements that are positioned at the same radial distance from the film axis (for example, GRIN optical elements that are arranged in a circular concentric ring centred on the film axis) may focus light towards off-axis points that are equidistant from the film axis, or the optical axis of the film. When the film is applied to a lens, substantially identical GRIN optical elements that are positioned at the same radial distance from the optical axis of the lens (for example, GRIN optical elements that are arranged in a circular concentric ring centred on the optical axis) may focus light towards off-axis points that are equidistant from the optical axis from the lens, and that lie on the same focal surface. The focal points formed from light passing through these GRIN optical elements may therefore form a circular ring at a focal surface. Similarly, substantially identical GRIN optical elements may be arranged to form an elliptical or oval ring centred on the film axis. When the film is applied to a lens, focal points formed from light from an on-axis distant point source passing through these GRIN optical elements may form an elliptical or oval ring at a focal surface. The film may be configurable on a surface of a lens such that light from a distant point source on the optical axis of the lens that passes through a region of the film having the base refractive index is focused towards a point on the optical axis of the lens, and light from a distant point source on the optical axis of the lens that passes through the at least one annular ring of gradient index optical elements is forms an annular ring of focal points at a focal surface.

At least two of the GRIN optical elements may have different asymmetric refractive index profiles. In this case, the at least two GRIN optical elements will have different local optical axes. When the film is applied to a lens, for first and second GRIN elements having different refractive index profiles and positioned at the same radial distance from the optical axis of the lens, light from an on-axis distant point source passing through the first GRIN optical element may be focused to a point that is a first distance away from the optical axis of the lens, and light from an on-axis distant point source passing through the second GRIN optical element may be focused to a point that is a second, different distance away from the optical axis of the lens. The focal point of each of the GRIN optical elements will be dependent upon the asymmetric refractive index profile of the GRIN element, and the position of the GRIN optical element.

When the film is applied to a lens, at least two of the GRIN optical elements having different refractive index profiles may focus light towards different focal surfaces.

Each of a plurality of the GRIN optical elements may have a different variation in refractive index. Alternatively, some of the GRIN optical elements may have the same variation in refractive index, and other elements may have a different variation in refractive index. A plurality of the GRIN optical elements may be distributed such that GRIN optical elements having the same or a similar variation in refractive index may be grouped in clusters or in an ordered arrangement. The film may be dividable into a plurality of distinct portions, with each portion comprising the GRIN optical elements having the same, or a similar variation in refractive index.

There may be a correlation between the refractive index profile of each of the at least one GRIN optical elements, and the radial position of that element from the film axis. GRIN optical elements positioned at the same radial distance from the film axis (for example, positioned around a circular ring centred on the film axis) may have the same refractive index profile. GRIN elements positioned at different radial distances from the film axis may have different refractive index profiles.

GRIN optical elements positioned at a greater radial distance from the film axis may have a refractive index profile that results in a greater focal power than GRIN optical elements positioned at a smaller radial distance from the film axis.

When the film is applied to a lens, and when such a lens is in use, the GRIN optical elements positioned at a greater radial distance from the optical axis of the lens substrate may focus light from an on-axis distant point source towards a surface that is closer to the posterior surface of the lens substrate than the GRIN optical elements positioned at a smaller radial distance from the optical axis of the lens.

The film may comprise GRIN optical elements forming a first circular ring and these GRIN elements may have a first refractive index profile. The film may comprise GRIN elements forming a second circular ring, and these GRIN elements may have a second, different refractive index profile. The first circular ring may be at a smaller radial distance from the film axis than the second circular ring. When the film is applied to a lens, the first refractive index profile may result in GRIN optical elements forming part of the first ring focusing light towards a first focal surface, and the second refractive index profile may result in GRIN elements forming the second ring focusing light towards a second focal surface. When such a lens is being worn by a user, the first focal surface and/or the second focal surface may be closer to the posterior surface of the lens than the base focal surface. The first focal surface may be closer to the posterior surface of the lens than the second focal surface. The first focal surface may be further away from the posterior surface of the lens than the second focal surface.

The film may comprise GRIN optical elements that form multiple concentric annular rings. GRIN optical elements within the same annular ring may have the same refractive index profile. GRIN optical elements that form different annular rings may have different refractive index profiles. Annular rings positioned at a greater radial distance the film axis may comprise GRIN elements that have a variation in refractive index that results in a greater focal power of that element. When film is applied to a lens, and when that lens is in use, annular rings positioned at a greater radial distance from the optical axis of the lens substrate may comprise GRIN elements that focus light towards a surface that is closer to the posterior surface of the lens than annular rings that are positioned at a smaller radial distance from the optical axis of the lens. Alternatively, annular rings positioned at a greater radial distance from the film axis may comprise GRIN elements that have a smaller focal power. In this case, when the film is applied to a lens and when that lens is in use, annular rings positioned at a greater radial distance from the optical axis of the lens may comprise GRIN elements that focus light towards a surface that is further away from the posterior surface of the lens than annular rings that are positioned at a smaller radial distance from the optical axis of the lens.

Each of the at least one GRIN optical elements may give rise to additional scattering of light that falls incident on the GRIN optical element, compared to light falling incident on the remainder of the film.

Each of the at least one GRIN optical elements may have a minimum difference in refractive index, compared to the base refractive index, of at least 0.001, preferably at least 0.005. Each of the at least one GRIN optical elements may have a minimum refractive index that is 0.001 greater than the base refractive index. Each of the at least one GRIN optical elements may have a minimum refractive index that is 0.005 greater than the base refractive index. Each of the at least one GRIN optical elements may have a maximum refractive index that is 0.005 less than the base refractive index. Each of the at least one GRIN optical elements may have a maximum refractive index that is 0.001 less than the base refractive index. Each of the at least one GRIN optical elements may have a maximum difference in refractive index, compared to the base refractive index of less than 0.1, preferably less than 0.025. Each of the at least one GRIN optical elements may have a maximum refractive index that is 0.1 greater than the base refractive index. Each of the at least one GRIN optical elements may have a maximum refractive index that is 0.025 greater than the base refractive index. Each of the at least one GRIN optical elements may have a minimum refractive index that is 0.1 less than the base refractive index. Each of the at least one GRIN optical elements may have a minimum refractive index that is 0.025 less than the base refractive index. Each of the at least one GRIN optical elements may have a minimum refractive index that is equal to the base refractive index. Each of the at least one GRIN optical elements may have a minimum refractive power that is between −25 D and +25 D, preferably between −0.25D and +25.0 D. For films that are for use in preventing or slowing the development or progression of myopia, each GRIN optical element may have a minimum refractive power that is between −0.25 and +25.0 D. For films that are for use in preventing or slowing the development or progression of hyperopia, each GRIN optical element may have a minimum refractive power that is between 0.0 and −25.0 D.

The film has a finite thickness, and each of the at least one GRIN optical elements may extend through the thickness of the film. Each of the at least one GRIN optical elements may extend only partway through the thickness of the film. Each of the at least one GRIN optical elements may be embedded within the film. The thickness of the film may be uniform. Each of the at least one GRIN optical elements may be embedded within the film with no change in the thickness of the film. Each of the at least one GRIN optical elements may have a uniform thickness. Each of the at least one GRIN elements may have a planar surface that lies flush with a surface of the film.

The film may be a cross-linked polymeric film including at the least one GRIN optical elements. The film may have been formed from a matrix of uncross-linked polymers.

The film may be re-usable, such that the film can be easily removed and reapplied to the same substrate or to a different lens substrate.

The film may have a uniform thickness.

The film may be a flexible, transparent film. For a contact lens, the film may have a thickness of between 1 μm and 100 μm, preferably between 10 μm and 20 μm, and more preferably between 14 μm and 18 μm. For a spectacle lens, the film may have a thickness of between 1 μm and 1000 μm, preferably between 10 μm and 20 μm, and more preferably between 14 μm and 18 μm.

Each of the at least one GRIN optical elements may have a width of between 1 μm and 5 mm, preferably between 10 μm and 2 mm. Each of the at least one GRIN optical elements may have a volume of between 1 $\mu m^3$ and 5 $mm^3$, preferably between 10 $\mu m^3$ and 2 $mm^3$. A plurality of the GRIN optical elements may occupy between 5% and 80% of the volume of the film. A plurality of the GRIN optical elements may cover between 20% and 80% of a surface area of the film. The film may include between 2 and 5000 of the GRIN optical elements.

The film may be sized and/or shaped to cover an entire surface of a lens, or substantially all of a surface of the lens. Alternatively, the film may be sized and/or shaped and cover a portion of a surface of the lens. When the film is applied to a lens, the film may be configured to cover a central portion of a surface of a lens, for example, a portion that, when the ophthalmic lens is in use, is configured to be situated in front of a lens wearer's eye. The film may be configured to cover an annular region of a surface surrounding the centre of the lens. There may be a peripheral region of the lens that is not covered by the film.

When the film is applied to a lens, the film may be configured to cover a portion of an annular region of the lens. It may be that the film does not cover a central region of the lens, and the central region may therefore be free from the GRIN optical elements. The film may cover all of the annular region, or part of the annular region. As used herein, the term annular region refers to a region of a lens that may extend around the entire outer edge of the central region, or may extend partially around the outer edge of the central region. The annular region of a lens may be circular, oval or elliptical in shape. The annular region of a lens may include a plurality of the GRIN optical elements. A plurality of the GRIN optical elements may be distributed around the entire annular region, or may be distributed across a portion of the annular region.

The film may include a plurality of concentric annular regions that are radially separated by a region of the film having the base refractive index.

The at least one GRIN optical element may be a photocured GRIN optical element. In the context of the present disclosure, photocured GRIN optical elements are GRIN optical elements that have been formed by photocuring, or photopolymerisation. Photocured GRIN optical elements may be produced from photopolymerisable or photocurable molecules or other photocurable elements. Photocuring results in an asymmetric varying refractive index across the photocured region. Photocurable molecules may be dispersed within the film. Photocurable molecules may be dispersed within a cross-linked polymeric matrix, or within a resin.

The film may comprise an adhesive surface for adhering the film to a surface of an ophthalmic lens. The adhesive may comprise a transparent adhesive such as an epoxy-based adhesive. The adhesive may be an adhesive layer.

According to a second aspect, the present disclosure provides an ophthalmic lens comprising a film. The film may include any of the features set out above. The ophthalmic lens (which may hereafter be referred to as the lens) may be a lens for preventing or slowing the development or progression of myopia. The lens may be a lens for correcting or improving vision associated with presbyopia, hyperopia, astigmatism, keratoconus or another refractive anomaly.

The film may cover an entire surface of the lens, or substantially all of a surface of the lens. Alternatively, the film may cover a portion of a surface of the lens. The film may cover a central portion of a surface of the lens, for example, a portion that, when the ophthalmic lens is in use, is configured to be situated in front of a lens wearer's eye. There may be a peripheral region of the lens that is not covered by the film.

The lens may be a spectacle lens. For a spectacle lens, it may be advantageous for the GRIN optical elements to be distributed across a relatively large area of the lens, as this may enable defocus caused by the GRIN optical elements to be maintained as the lens wearer's eye moves relative to the lens. A plurality of the GRIN optical elements distributed across a spectacle lens may enable a consistent myopic defocus to be maintained. The spectacle lens may comprise PMMA, CR-39, polycarbonate, Trivex, or crown glass.

The ophthalmic lens may be a contact lens. The film may be provided on an anterior surface of the ophthalmic lens. In the context of the present disclosure, the anterior surface of the ophthalmic lens is the forward facing, or exterior surface of the lens when the ophthalmic lens is being worn by a lens wearer.

The ophthalmic lens may be circular in shape. The ophthalmic lens may be elliptical in shape. The ophthalmic lens may be oval in shape. The ophthalmic lens may be rectangular in shape. The ophthalmic lens may be square in shape. The anterior surface of the ophthalmic lens may have an area of between 1200 $mm^2$ and 3000 $mm^2$. The ophthalmic lens may be formed from transparent glass or rigid plastic such as polycarbonate. The ophthalmic lens may be substantially planar and may have at least one curved surface providing a lens power.

The lens may be a contact lens. As used herein, the term contact lens refers to an ophthalmic lens that can be placed onto the anterior surface of the eye. It will be appreciated that such a contact lens will provide clinically acceptable on-eye movement and not bind to the eye or eyes of a person. The contact lens may be in the form of a corneal lens (e.g., a lens that rests on the cornea of the eye). In embodiments where the lens is a contact lens, the lens may have a surface area of between 60 $mm^2$ and 750 $mm^2$. The lens may have a circular shape. The lens may have an oval shape. The lens may have an elliptical shape. The lens may have a diameter of between 10 mm and 15 mm.

The lens may be a rigid contact lens. The lens may be a rigid, gas permeable contact lens.

The contact lens may be a toric contact lens. For example, the toric contact lens may include an optic zone shaped to correct for a person's astigmatism. The lens may be a scleral contact lens.

The ophthalmic lens may be a soft contact lens, such as a hydrogel contact lens or a silicone hydrogel contact lens.

The ophthalmic lens may comprise an elastomer material, a silicone elastomer material, a hydrogel material, or a silicone hydrogel material, or combinations thereof. As understood in the field of contact lenses, a hydrogel is a material that retains water in an equilibrium state and is free of a silicone-containing chemical. A silicone hydrogel is a hydrogel that includes a silicone-containing chemical. Hydrogel materials and silicone hydrogel materials, as described in the context of the present disclosure, have an equilibrium water content (EWC) of at least 10% to about 90% (wt/wt). In some embodiments, the hydrogel material or silicone hydrogel material has an EWC from about 30% to about 70% (wt/wt). In comparison, a silicone elastomer material, as described in the context of the present disclosure, has a water content from about 0% to less than 10% (wt/wt). Typically, the silicone elastomer materials used with the present methods or apparatus have a water content from 0.1% to 3% (wt/wt). Examples of suitable lens formulations include those having the following United States Adopted Names (USANs): methafilcon A, ocufilcon A, ocufilcon B, ocufilcon C, ocufilcon D, omafilcon A, omafilcon B, comfilcon A, enfilcon A, stenfilcon A, fanfilcon A, etafilcon A, senofilcon A, senofilcon B, senofilcon C, narafilcon A, narafilcon B, balafilcon A, samfilcon A, lotrafilcon A, lotrafilcon B, somofilcon A, riofilcon A, delefilcon A, verofilcon A, kalifilcon A, lehfilcon A, and the like.

Alternatively, the ophthalmic lens may comprise, consist essentially of, or consist of a silicone elastomer material. For example, the lens may comprise, consist essentially of, or consist of a silicone elastomer material having a Shore A hardness from 3 to 50. The Shore A hardness can be determined using conventional methods, as understood by persons of ordinary skill in the art (for example, using a method DIN 53505). Other silicone elastomer materials can be obtained from NuSil Technology or Dow Chemical Company, for example.

The film may be provided on an anterior surface of the lens. The film may be provided on a posterior surface of the lens. A film may be provided on both an anterior and posterior surface of the lens. The film may be releasably adhered or otherwise applied to the lens, i.e., it may be readily removable from the lens. The film may be re-usable, such that the film can be easily removed and reapplied to the same substrate or to a different lens.

The ophthalmic lens may have an optic zone. The optic zone encompasses parts of the lens that have optical functionality. The optic zone is configured to be positioned over or in front of the pupil of an eye when in use. The optic zone may be surrounded by a peripheral zone. The peripheral zone is not part of the optic zone, but sits outside the optic zone. For a contact lens, the peripheral zone may sit above the iris when the lens is worn. The peripheral zone may provide mechanical function, for example, increasing the size of the lens thereby making the lens easier to handle. For a contact lens, the peripheral zone may provide ballasting to prevent rotation of the lens, and/or providing a shaped region that improves comfort for the lens wearer. The peripheral zone may extend to the edge of the lens. The film may cover the optic zone, but it may be that it does not cover the peripheral zone.

The lens may have a central region and an annular region surrounding the central region. When the film is applied to the lens, the film may cover a portion of the annular region. It may be that the film does not cover the central region, and the central region may therefore be free from the GRIN optical elements. The film may cover all of the annular region, or part of the annular region. As used herein, the term annular region refers to a region that may extend around the entire outer edge of the central region, or may extend partially around the outer edge of the central region. The annular region may be circular, oval or elliptical in shape.

The annular region may include a plurality of the GRIN optical elements. A plurality of the GRIN optical elements may be distributed around the entire annular region, or may be distributed across a portion of the annular region.

The lens may further comprise an adhesive provided between the film and the surface of the lens substrate. The adhesive may comprise a transparent adhesive such as an epoxy-based adhesive. The adhesive may be an adhesive layer. The adhesive layer may be applied to an anterior surface of the lens substrate during manufacture of the lens. The adhesive may permanently adhere the layer to the surface of the lens. Alternatively, the film may be bonded to the surface of the lens. The film may be permanently, or irreversibly bonded to the surface of the lens.

The lens may further comprise a protective layer provided on an anterior surface of the film. The anterior surface of the film is the forward facing, or exterior surface of the film when the lens is in normal use and being worn by a lens wearer. The film may comprise a substrate that is configured to provide a protective layer when the film is applied to a surface of an ophthalmic lens. The protective layer may cover all or part of the anterior surface of the film. The protective layer may be a transparent layer. The protective layer may comprise polycarbonate (PC). The protective layer may comprise polyethylene terephthalate (PET) or cellulose triacetate (TAC). The protective layer may comprise a substance that has negligible birefringence. The protective layer may be impermeable to water. The protective layer may be scratch resistant. The protective layer may have the base refractive index. The protective layer may offer a degree of UV protection. The protective layer may be adhered to the film using an adhesive.

According to a third aspect, the present disclosure provides spectacles comprising an ophthalmic lens according to the second aspect. The ophthalmic lens may include any of the features set out above.

According to a fourth aspect, the present disclosure provides a method of manufacturing a film. The film may include any of the features set out above. The method comprises providing a photocurable film, and using a digital light projection system to photocure at least one region of the film, thereby producing at least one photocured gradient index optical element having an asymmetric refractive index profile.

In the context of the present disclosure, photocured GRIN optical elements are GRIN optical elements that have been formed by photocuring, or photopolymerisation. Photocured GRIN optical elements may be produced from photopolymerisable or photocurable molecules or other photocurable elements. Photocuring results in an asymmetric varying refractive index across the photocured region. Photocurable molecules may be dispersed within the film. Photocurable molecules may be dispersed within a cross-linked polymeric matrix, or within a resin.

In the context of the present disclosure, the Digital Light Projection (DLP) system is a light illumination system that is used to direct light towards a photocurable film, thereby enabling a region of the film to be photocured. The DLP system used has a wavelength that is suitable for photopolymerisation or photocuring of the target film material. For example, for a Bayfol® HX film, the DLP system may have a wavelength in the range of between 440 nm to 660 nm. The pixel resolution of the DLP system may be less than 100 µm, preferably less than 30 µm, more preferably less than 10 µm. The DLP system may be a commercial DLP system, for example a 3DLP9000-LED.9"WQXGA Light Engine with a 460 nm wavelength and 30 nm pixel resolution. The DLP system may include a micro-electromechanical system (MEMS). The DLP system may include a digital mirror device. The digital mirror device may direct light, and/or control the transmission of light towards the film.

The DLP system may be used to illuminate the entire film, or a region of the film. The DLP system may be used to photocure an individual photocurable element or molecule, or a plurality of individual photocurable molecules. A plurality of individual photocurable molecules may be photocured successively or simultaneously. The DLP system may be used to illuminate an annular region of the film, or a plurality of concentric annular regions of the film.

Using the digital light projection system may comprise using a grayscale image to control projection of light onto the film. The grayscale image may provide a template for projecting light from the DLP system onto the film. The grayscale image may be a .bmp image. The grayscale image may mask some regions of the film, such that these regions are not exposed to light from the DLP system, whilst exposing at least one region of the film to light from the DLP system. The grayscale image may expose a plurality of regions to light from the DLP system. Regions of the film that are exposed to light from the DLP system may be photocured to produce the photocured GRIN optical elements.

The method of manufacturing the film may comprise generating a design for the film, wherein the design has a desired pattern of photocured GRIN optical elements having asymmetric refractive index profiles. The method may comprise producing the grayscale image using the design.

The grayscale image may be designed to generate any of the arrangements of photocured GRIN elements described above, wherein the GRIN optical elements have asymmetric refractive index profiles. The grayscale image may comprise a plurality of apertures that enable light from the DLP system to reach the film. Regions of the film that are illuminated by light from the DLP system may be photocured. The image may comprise a plurality of portions that block or mask light from reaching the film. Regions of the film that are not illuminated by light from the DLP system will not be photocured. The image may comprise a plurality of apertures arranged in a pattern. The desired pattern of photocured GRIN optical elements may be an array of GRIN optical elements arranged on lattice points of the film, and in this case, the image may comprise a plurality of apertures arranged on lattice points. The lattice may be a triangular lattice, a square lattice or cuboidal lattice. Alternatively, the desired pattern of photocured gradient index optical elements may comprise at least one annular ring of photocured gradient index optical elements. The desired pattern of photocured gradient index optical elements may comprise a plurality of concentric annular rings of photocured gradient index optical elements.

The method may comprise modelling a desired asymmetric refractive index profile for each of the at least one photocured GRIN elements, and determining least one light exposure condition required to generate the desired asymmetric refractive index profile.

Modelling may be used to determine the intensity of light exposure and/or duration of light exposure and/or wavelength of light exposure required to photocure the GRIN elements having a desired asymmetric refractive index profile. The conditions may be dependent upon the characteristics of the DLP system, for example, the wavelength, intensity, and type of light source. The conditions may be dependent upon film properties, for example, the film material and film thickness. The modelling may be performed using any suitable modelling software, for example MATLAB™. Modelling may be performed using experimental (measured) data, or theoretical (predicted) data. Predicted data may be based on known properties of the film material and/or the DLP system. The desired refractive index profile for each of the photocured GRIN elements may be defined by an asymmetric polynomial function, or may be approximated by an asymmetric polynomial function. The desired asymmetric refractive index profile may be modelled for a single photocured GRIN element, or for a plurality of photocured GRIN elements. For a film including a plurality of the GRIN optical elements, the desired asymmetric refractive index profile for each of the at least one photocured GRIN elements may be the same, or each of the photocured GRINs element may have different desired asymmetric refractive index profiles.

The modelling step may comprise measuring or plotting a desired refractive index change map as a function of a light exposure condition. The light exposure condition may be light intensity, duration of exposure, or light wavelength. The map may be generated as a map that has a non-planar surface. The map may be generated as a 3D map. The map may be iteratively updated and/or optimised to generate a desired refractive index profile for a photocured GRIN optical element. The map may be a refractive index change map for a single photocured GRIN optical element or for a plurality of photocured GRIN optical elements. The map may be used to generate a refractive index gradient pixel matrix for use in the DLP imaging system. The pixel matrix may identify required light exposure conditions for each pixel of the DLP imaging system to generate the required refractive index variation across the film. The refractive index gradient pixel matrix may be configured to generate a single photocured GRIN optical element, or between 2 and 5000 of the photocured GRIN elements distributed across the film. The refractive index gradient pixel matrix may be configured to generate photocured the GRIN elements across between 20% and 80% of the area of the film.

The modelling step may include converting a refractive index change map into a digital light projection intensity map. The digital light projection intensity map may be a pixel matrix for the DLP system. The digital light projection intensity map may be generated from a refractive index gradient pixel matrix. The digital light projection intensity map may be used when generating a grayscale image for use in the DLP system. The digital light projection intensity map maybe used to determine the required exposure conditions for use in the DLP system. The DLP intensity map may be used to produce a .bmp image. The image may be an 8-bit image. The light exposure conditions may be dependent upon the film type, the required pattern or arrangement of the photocured GRIN optical elements, the film properties, and the properties of the DLP imaging system. The digital light projection intensity map may therefore be used to control projection of light onto the film by determining the required exposure conditions.

The modelled desired refractive index profile may result in an asymmetric refractive index profile when the refractive index change map is converted into a digital light projection intensity map The desired refractive index profile may result in an asymmetric refractive index profile that varies in a radial direction, in a plane parallel to a surface of the film. The desired refractive index profile may result in an asymmetric refractive index profile that varies in at least one linear direction that is parallel to a surface of the film. The desired refractive index profile may result in an asymmetric refractive index profile that varies in a circumferential direction, in a plane parallel to a surface of the film.

The modelling step may include modelling a least two different desired refractive index profiles for at least two different photocured GRIN optical elements. The modelling step may include selecting a desired refractive index profile for each of the at least one GRIN optical elements depending upon the position of the element within the desired pattern. If the desired pattern of GRIN optical elements comprises a plurality of concentric annular rings of photocured gradient index optical elements, the modelling step may include selecting the same desired refractive index profile for GRIN optical elements forming the same annular ring. The modelling step may include selecting different desired refractive index profiles for GRIN optical elements that form part of different annular rings. The modelling step may comprise selecting a desired refractive index for each of the at least one GRIN optical elements such that GRIN optical elements positioned at the same radial distance from the film axis have the same desired refractive index profile. The modelling step may comprise selecting a desired refractive index profile for each of the at least one GRIN optical elements such that GRIN optical elements positioned at a greater distance from the film axis have a more asymmetric desired refractive index profile. Alternatively, the modelling step may comprise selecting a desired refractive index profile for each of the at least one GRIN optical elements such that GRIN optical elements positioned at a greater distance from the film axis have a more symmetric desired refractive index profile.

The method may comprise exposing the film to light from the DLP, using a grayscale image and/or a digital light projection intensity map to control the projection of light onto the light exposure across the film. The method may comprise waiting for a minimum amount of time for the film to develop. The method may comprise, after waiting for a minimum time for the film to develop, flood curing or flood exposing the film using the DLP system or using a UV oven.

The DLP system may include optics that cause non-linear intensity responses. The method may involve determining whether significant non-linear responses exist at any or all pixels. If significant non-linear responses exist, the method may comprise adapting the digital light projection intensity map to account for the non-linear responses.

The desired refractive index profile for each of the at least one GRIN optical elements may give rise to a photocured GRIN optical element having a diameter of between about 1 µm and 5.0 mm. The modelled refractive index profile may be configured to generate at least one photocured GRIN optical element having a diameter of between about 1 µm and 5.0 mm. The modelled refractive index profile may be optimised or iteratively optimised to generate at least one photocured GRIN optical element having a diameter of between about 1 µm and 5.0 mm. The desired refractive index profile for each of the at least one photocured GRIN optical elements may give rise to photocured GRIN elements having a volume of between 1 µm³ and 5 mm³. The desired refractive index profile for each of the at least one photocured GRIN optical elements may give rise to disc-shaped photocured GRIN elements or spherical photocured GRIN elements having an asymmetric profile in a direction parallel to a surface of the film. The modelled refractive index profile may be optimised or iteratively optimised to generate at least one photocured GRIN optical elements having any of the characteristics described above.

Figure 1B:
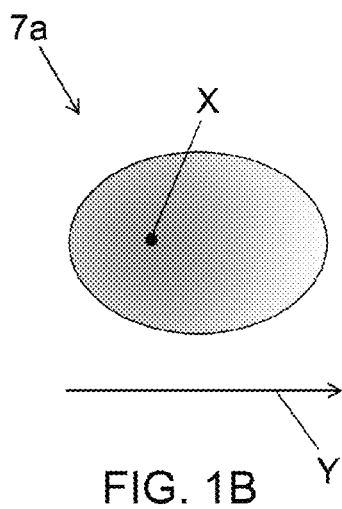
FIG. 1B is a top view of one of the GRIN optical elements of the film of FIG. 1A.
Figure 1C:
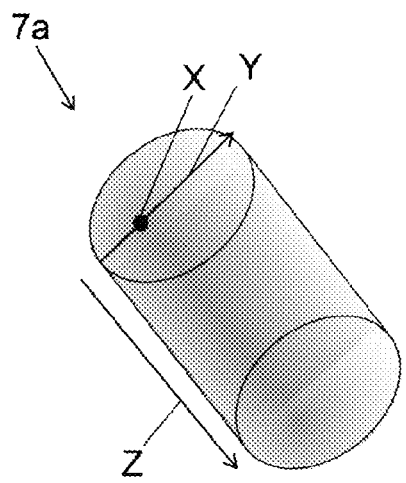
FIG. 1C is a perspective view of the GRIN optical element shown in FIG. 1A.

FIG. 1A is a schematic top view of a film 1 for applying to an ophthalmic lens, including a plurality of photocured GRIN optical elements 7a, 7b having asymmetric refractive index profiles, according to an embodiment of the present disclosure. The GRIN optical elements 7a, 7b are arranged in concentric circles 9a, 9b (the dashed lines 9a, 9b are provided as a guide to the eye and do not represent structural features of the film 1). The concentric circles are centred on a film axis 3, which extends in a direction that is substantially perpendicular to the plane of the film 1. FIG. 1B is a top view of one of the GRIN optical elements 7a, of the film 1 shown in FIG. 1A, and FIG. 1C shows the same element 7a in perspective view. Each of the GRIN optical elements 7a, 7b is substantially cylindrical in shape with an elliptical cross section in a plane parallel to a surface of the film 1. Each of the GRIN optical elements 7a, 7b has a refractive index profile that varies in both a radial direction and transverse direction in a plane perpendicular to the cylinder axis of the element 7a, 7b, i.e., a plane parallel to a surface of the film 1, resulting in an asymmetric refractive index profile across the element 7a, 7b. The refractive index across the surface of the element 7a varies in a plane perpendicular to the cylinder axis of the element 7a varies radially outwards from a point 'X' in a plane parallel to the anterior surface of the film 1, and transversely in a direction indicated by arrow 'Y' that is parallel to the anterior surface of the film 1. The refractive index profile is constant (i.e., does not vary) in a direction 'Z' (see FIG. 1C), which is parallel to the cylinder axis of the element 7a. The variation in refractive index has an asymmetric profile 22 in the direction 'Y', as shown in FIG. 1D.

Figure 1D:
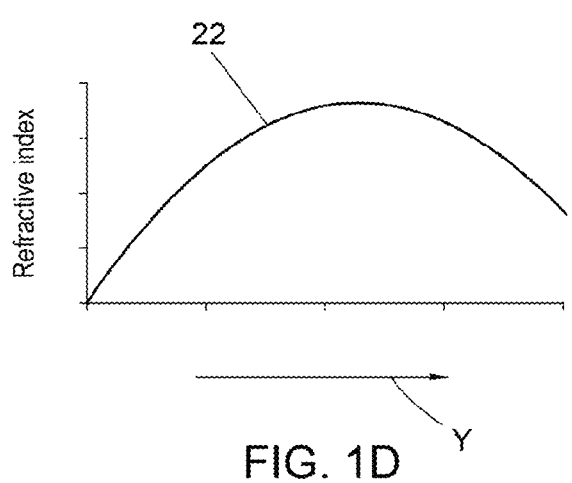
FIG. 1D is a graph showing the refractive index profile of the GRIN optical element shown in FIGS. 1B and 1C.
Figure 1E:
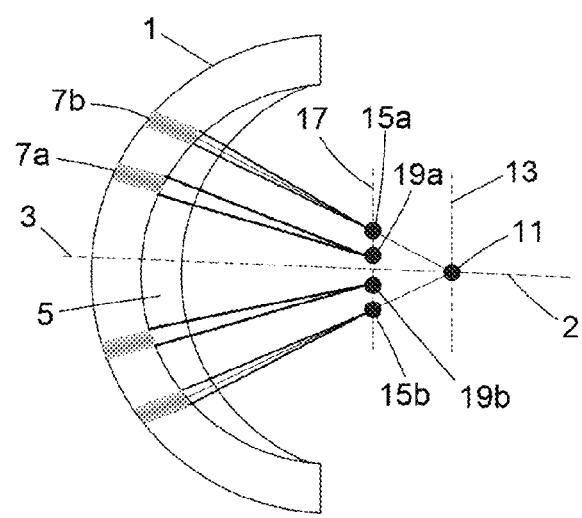
FIG. 1E is a cross-sectional view of the film of FIG. 1A applied to an ophthalmic lens.

The GRIN optical elements 7a that form the inner circle 9a all have the same refractive index profile (as shown in FIGS. 1B-1D), and are all positioned at the same radial distance from the film axis 3. FIG. 1E shows a cross-sectional view of the film 1 of FIG. 1A, applied to a lens 5. The film axis 3 aligns with the optical axis 2 of the lens 5. As the GRIN optical elements 7a have an asymmetric refractive index profile, when the film 1 is applied to the lens 5, the local optical axis of the GRIN elements 7a will be tilted relative to the optical axis 2 of the lens 5. Light from a distant point source on the optical axis 2 of the lens 5 (hereafter referred to as an on-axis distant point source) that passes through a region of the film 1 having the base refractive index will be focused to a spot 11 on the optical axis 2. Light from an on-axis distant point source that passes through the GRIN optical elements 7a will be focused away from the optical axis 2 of the lens 5. Light from an on-axis distant point source that passes through the GRIN optical elements 7a that form the inner ring 9a, will form a ring of focal points 15a, 15b at a focal surface 17. When the lens 5 is worn by a lens wearer, the GRIN elements 7a that form the inner ring 9a focus light from an on-axis distant point source towards an add power focal surface 17 that is closer to the posterior surface of the lens 5 (i.e., further away from the retina, or closer to the cornea), compared to the base power focal surface 13. The local optical axes of each of the GRIN optical elements 7a intersect the optical axis 2 of the lens 5, and light rays from an on-axis distant point source that pass through the GRIN optical elements 7a that form the inner ring 9a are directed such that a small spot size of unfocused light is formed at the base power surface 13. This may improve the quality of an image formed at the retina for a lens wearer.

The GRIN optical elements 7b that form the outer ring 9b all have the same variation in refractive index as the GRIN elements 7a that form the inner ring 9a (as shown in FIGS. 1A and 1E). The GRIN optical elements 7b that form the outer ring 9b are all positioned at the same radial distance from the optical axis 2 of the lens 5 and the film axis 3, and at a greater radial distance from the optical axis 2 and the film axis 3 than the GRIN optical elements 7a that form the inner ring 9a.

The GRIN optical elements 7b have local optical axes that focus light from an on-axis distant point source to form a ring of focal points 19a, 19b (shown in FIG. 1E). The ring of focal points 19a, 19b will have a larger radius than the ring of focal points 15a, 15b formed from light passing through the inner ring 9a of GRIN optical elements 7a. The refractive profile of the GRIN optical elements 7b forming the outer ring 9b is the same as the refractive index profile of the GRIN optical elements 7a forming the inner ring 9a. When the lens 5 is being worn by a wearer, the GRIN optical elements 7b forming the outer ring 9b will focus light towards the same add power focal surface 17 as the GRIN elements 7a that form the inner ring 9a. The local optical axes of each of the GRIN optical elements 7b intersect the optical axis 2 of the lens 5 and the film axis 3, and light rays from an on-axis distant point source that pass through the GRIN optical elements 7b that form the outer ring 9b are directed such that a small spot size of unfocused light is formed at the base power surface 13. This may improve the quality of an image formed at the retina for a lens wearer.

Figure 2A:
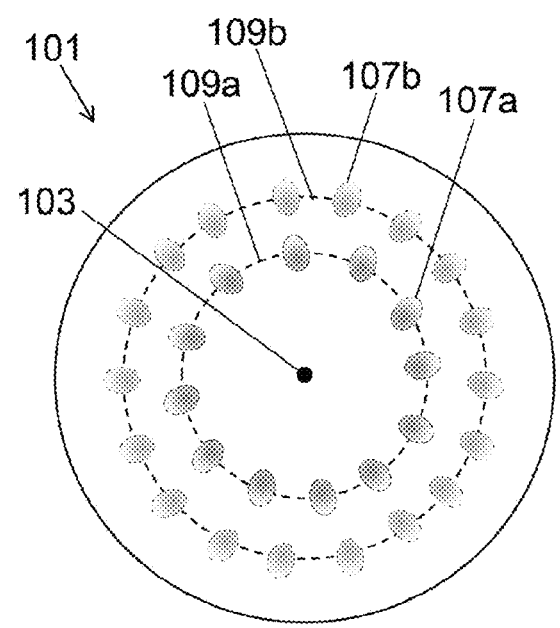
FIG. 2A is a top view of a film according to another embodiment of the present disclosure.

FIG. 2A is a schematic top view of a film 101 for applying to an ophthalmic lens, including a plurality of photocured GRIN optical elements 107a, 107b having asymmetric refractive index profiles, according to an embodiment of the present disclosure.

Figure 2B:
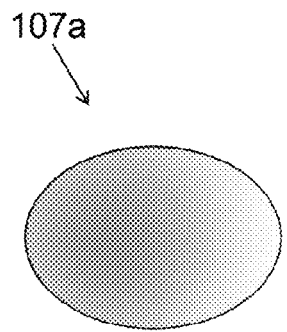
FIG. 2B is a top view of one of the GRIN optical elements that forms part of the inner ring of GRIN optical elements in the film of FIG. 2A.

The GRIN optical elements 107a, 107b are arranged in concentric circles 109a, 109b (the dashed lines 109a, 109b are provided as a guide to the eye and do not represent structural features of the film 101). The concentric circles are centred on a film axis 103, which extends in a direction that is substantially perpendicular to the plane of the film 101. FIG. 2B is a top view of one of the GRIN optical elements 107a that forms the inner circle 109a of GRIN optical elements in the film 101 shown in FIG. 2A, and FIG. 2C shows the same element 107a in perspective view.

Figure 2D:
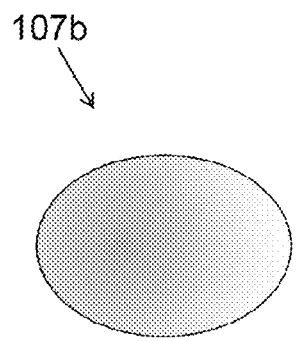
FIG. 2D is a top view of one of the GRIN optical elements that forms part of the outer ring of GRIN optical elements in the film of FIG. 2A.
Figure 2C:
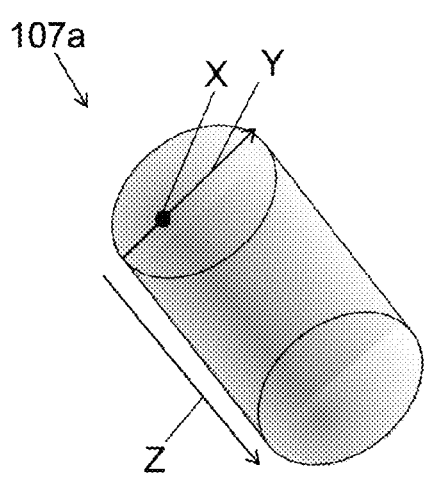
FIG. 2C is a perspective view of the GRIN optical element shown in FIG. 2B.
Figure 2E:
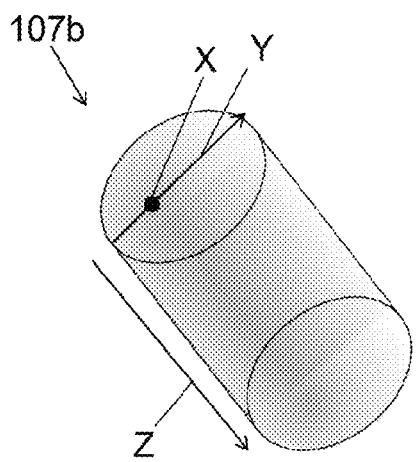
FIG. 2E is a perspective view of the GRIN optical element shown in FIG. 2D.

FIG. 2D is a top view of one of the GRIN optical elements 107b that forms the outer circle 109b of GRIN optical elements in the film 101 shown in FIG. 2A, and FIG. 2E shows the same element 107b in perspective view.

Figure 2F:
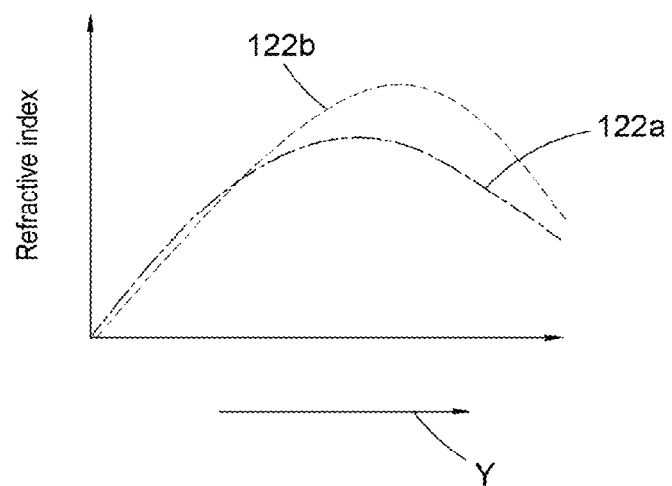
FIG. 2F is a graph showing the refractive index profiles of the GRIN optical elements shown in FIGS. 2B-2E.

The GRIN elements 107a that form the inner ring 109a all have the same asymmetric refractive index profile. The GRIN optical elements 107b that form the outer ring 109b also all have the same variation in refractive index, but these elements 107b have a different refractive index profile to the GRIN optical elements 107a that form the inner ring 109a. Each of the GRIN optical elements 107a, 107b is substantially cylindrical in shape with an elliptical cross section in a plane parallel to a surface of the film 101. Each of the GRIN optical elements 107a, 107b has a refractive index profile that varies in both a radial direction and transverse direction in a plane perpendicular to the cylinder axis of the element 107a, 107b, i.e., a plane parallel to a surface of the film 101, resulting in an asymmetric refractive index profile across the element 107a, 107b. As shown in FIGS. 2C and 2E, the refractive index across the surface of the element 107a, 107b varies in a plane perpendicular to the cylinder axis of the element 107a, 107b varies radially outwards from a point 'X' in a plane parallel to the anterior surface of the film 101, and transversely in a direction indicated by arrow 'Y' that is parallel to the anterior surface of the film 101, The refractive index profile is constant (i.e., does not vary) in a direction 'Z', which is parallel to the cylinder axis of the element 107a. The variation in refractive index in the direction 'Y' for both elements is shown in FIG. 2F. The profile 122a for an element 107a forming part of the inner circle 109a is shown by the dashed-dot line, and the profile 122b for an element 107b forming part of the outer circle 109b is shown by the dashed line.

Figure 2G:
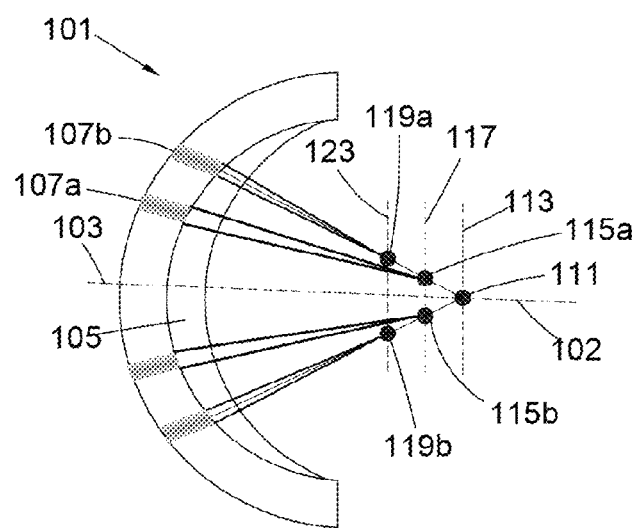
FIG. 2G is a cross-sectional view of the film of FIG. 2A applied to an ophthalmic lens.

FIG. 2G shows a cross-sectional view of the film 101 of FIG. 2A, applied to a lens 105. The film axis 103 (dot-dash line) aligns with the optical axis 102 (dashed lined) of the lens 105. Light from a distant point source on the optical axis 102 of the lens 105 that passes through a region of the film 101 having the base refractive index will be focused to a spot 111 on the optical axis 102.

As the GRIN elements 107a that form part of the inner circle 109a (see FIG. 2A) all have the same asymmetric refractive index profile, shown in FIGS. 2B, 2C and 2F, and as they are positioned at the same radial distance from the optical axis 102, light from an on-axis distant point source that passes through the GRIN optical elements 107a will be focused away from the optical axis 102 and will form a ring of focal points 115a, 115b (shown in FIG. 2G). When the lens 101 is being worn by a lens wearer the refractive index profile of the GRIN optical elements 107a results in light from an on-axis distant point source being focused at a low add power focal surface 117 closer to the posterior surface of the lens 101, compared to the base power focal surface 113.

The GRIN optical elements 107b that form the outer ring 109b also all have the same variation in refractive index, but these elements 107b have a different refractive index profile to the GRIN optical elements 107a that form the inner ring 109a. The GRIN optical elements 107b that form the outer ring 109b are all positioned at the same radial distance from the optical axis 102, and at a greater radial distance from the optical axis 102 than the GRIN optical elements 107a that form the inner ring 109a. The GRIN optical elements 107b that form the outer ring 109b (see FIG. 2A) have a different focal power compared to the GRIN optical elements 107a that form the inner ring 109a. The local optical axes of the GRIN optical elements 107b that form part of the outer ring 109b are tilted more relative to the optical axis 102 of the lens 101 compared to the local optical axes of the GRIN optical elements 107a that form part of the inner ring 109a. Light from an on-axis distant point source passing through the GRIN optical elements 107b that form the outer ring 109b is focused to form a ring of focal points 119a, 119b. The ring of focal points 119a, 119b has a larger radius than the ring of focal points 115a, 115b formed from light passing through the inner ring 109a of GRIN optical elements 107a, and light passing through the outer ring GRIN optical elements 107b is focused at off-axis points on a high add power focal surface 123 that is closer to the posterior surface of the lens 101 compared to the base power focal plane 113 and closer to the posterior surface of the lens 101 compared to the low add power focal surface 117.

Figure 3A:
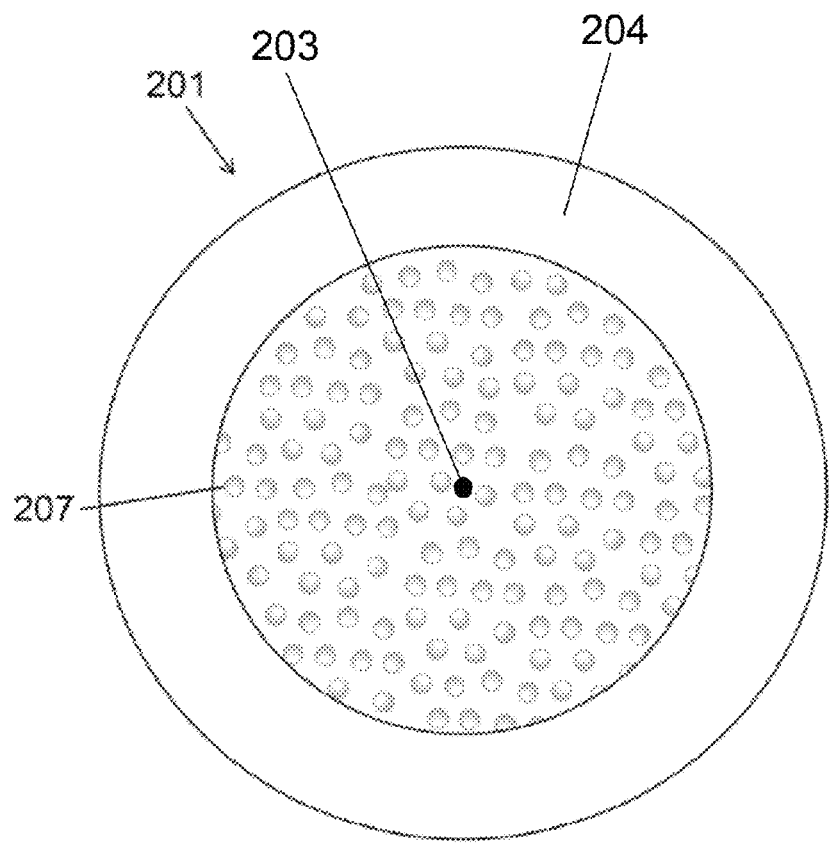
FIG. 3A is a top view of a film according to an embodiment of the present disclosure.

FIG. 3A is a schematic top view of another film 201 for applying to an ophthalmic lens, including a plurality of photocured GRIN optical elements 207 having asymmetric refractive index profiles, according to an embodiment of the present disclosure. The base refractive index of the film 201 is uniform, and the film 201 has a uniform thickness. The film 201 comprises a plurality of GRIN optical elements 207 that are arranged in a random pattern across a central region of the film 201. A peripheral region 204 of the film 201 is free from GRIN optical elements. The GRIN optical elements 207 have a circular cross-section in the plane of the film 201, and have an asymmetric refractive index profile that varies continuously in a circumferential direction (in the direction of the arrow 'W' shown in FIGS. 3B and 3C), and in a radial direction. The asymmetric variation in refractive index is in a plane that is perpendicular to a film axis 203. The film axis 203 is at positioned at the radial midpoint of the film 201. The asymmetric refractive index variation for the elements 207, in the direction 'W', is shown by the curve 222 in FIG. 3C. The GRIN elements 207 all have the same variation in refractive index, as shown in FIGS. 3B and 3C, but are positioned at different radial distances from the film axis 203.

Figure 3B:
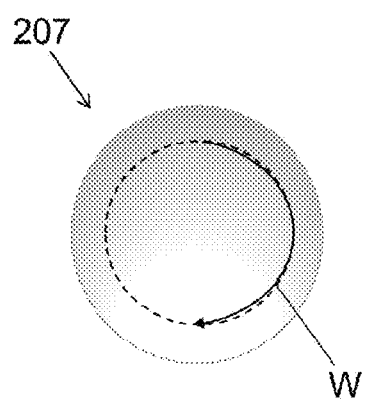
FIG. 3B is a top view of one of the GRIN elements shown in FIG. 3A.
Figure 3C:
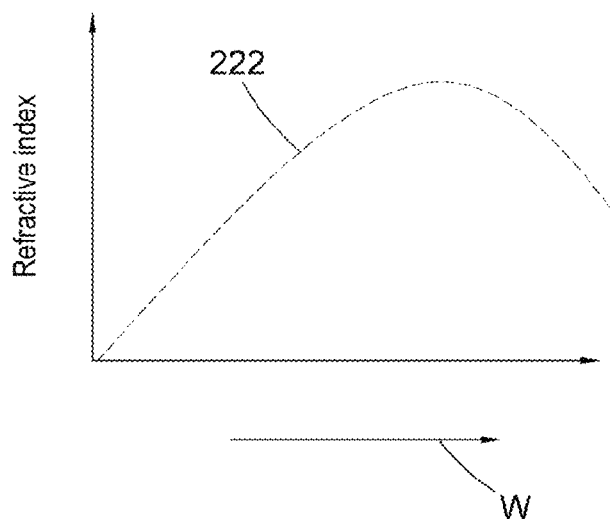
FIG. 3C is a graph showing the refractive index profile in a circumferential direction around one of the GRIN optical elements shown in FIG. 3B.

FIG. 3B is a top view of a GRIN optical element 207 of the film 201 shown in FIGS. 2A and 2B. The GRIN element 207 has a circular cross-section and an asymmetric refractive index profile that varies in circumferential direction, indicated by arrow 'W', and in a radial direction. The refractive index profile in the direction of the arrow 'W' along the dashed curve shown in FIG. 3B is plotted as the curve 222 in FIG. 3C.

Figure 3D:
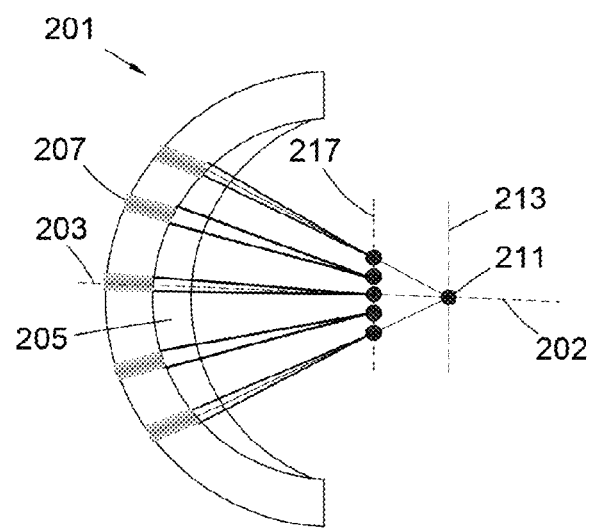
FIG. 3D is a cross-sectional view of the film of FIG. 3A applied to an ophthalmic lens.

FIG. 3D shows the film 201 of FIG. 3A applied to a lens 205. The film 201 covers the anterior surface of the lens 205. Light from an on-axis distant point source that passes through a region of the film 201 having the base refractive index will be focused to a spot 211 on the optical axis 202 of the lens 205. The optical axis 202 (dashed line) of the lens 205 coincides with the film axis 203 (dot-dash line). The spot 211 lies on a base power focal surface 213. The GRIN elements 207 all have the same variation in refractive index, as shown in FIGS. 3B and 3C, but are positioned at different radial distances from the optical axis 202. As the GRIN elements 207 have an asymmetric refractive index profile light from an on-axis distant point source that passes through the GRIN optical elements 207 will be focused away from the optical axis 202. When the lens 205 is being worn by a wearer, the GRIN optical elements 207 focus light towards off-axis focal points on an add power focal surface 217 that is closer to the posterior surface of the lens 211 compared to the base power focal surface 213, as shown in FIG. 3D.

Figure 4:
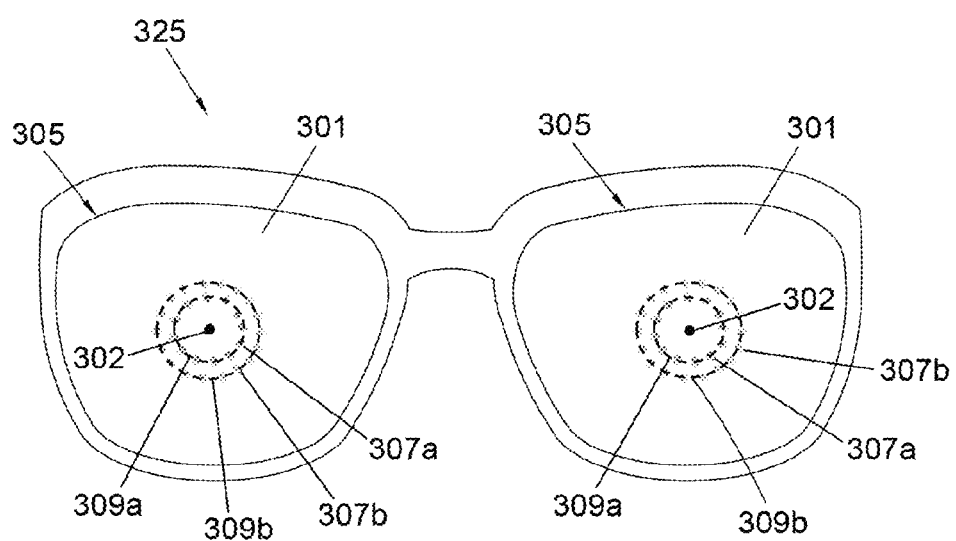
FIG. 4 is a front view of a pair of spectacles including lenses according to an embodiment of the present disclosure.

FIG. 4 is a front view of a pair of spectacles 325 including two lenses 305. Each lens 305 is centred on an optical axis 302, and comprises a film 301 provided on an anterior surface of the lens 305. The base refractive index of the film 301 is uniform, and the film 301 has a uniform thickness. The film 301 covers the anterior surface of the lens 305. Light from an on-axis distant point source that passes through the film 301 will be focused to a spot on the optical axis 302 of the lens 305 at a base power focal surface (not shown).

Each film 301 comprises a plurality of GRIN optical elements 307a, 307b that are arranged in concentric circles 309a, 309b (the dashed lines are provided as a guide to the eye and do not represent structural features of the lenses 301). Each of the GRIN optical elements 307a, 307b has a refractive index profile that varies in both a radial and transverse direction across the element 307a, 307b parallel to a plane of the film 301, resulting in an asymmetric profile. The GRIN elements 307a that form the inner circle 309a all have the same variation in refractive index and are all positioned at the same radial distance from the optical axis 302 of the lens 305. As the GRIN elements 307a have an asymmetric refractive index profile, light from an on-axis distant point source that passes through the GRIN optical elements 307a will be focused away from the optical axis 302. The GRIN optical elements 307a are arranged in a circle centred on the optical axis 302 of each lens 301, and light from a distant point source passing through the GRIN optical elements 307a that form the inner ring 309a will form a ring of focal points.

The GRIN optical elements 307b that form the outer ring 309b also all have the same variation in refractive index, but these elements 307b have a different variation in refractive index to the GRIN optical elements 307a that form the inner ring 309a. The GRIN optical elements 307b that form the outer ring 309b are all positioned at the same radial distance from the optical axis 302 of the lens, and at a greater radial distance from the optical axis 302 than the GRIN optical elements 307a that form the inner ring 309a. Light from an on-axis distant point source passing through the GRIN optical elements 307b that form the outer ring 309b will form a ring of focal points. This ring of focal points will have a larger radius than the ring of focal points formed from light passing through the inner ring 309a of GRIN optical elements 307a. The refractive index profile of the GRIN optical elements 307b forming the outer ring 309b is different to the refractive index profile of the GRIN optical elements 307a forming the inner ring 309a. When the lenses 305 are being worn by a wearer, light passing through the GRIN optical elements 307a forming the inner ring 309a will be focused to points on a first focal surface, and light passing through the GRIN optical elements 307b forming the outer ring 309b will be focused to points at a second, different focal surface. When the lens 305 is being worn be a lens wearer, both the first and second focal surfaces will be closer to the posterior surface of the lens 305 than the base power focal surface.

Figure 5A:
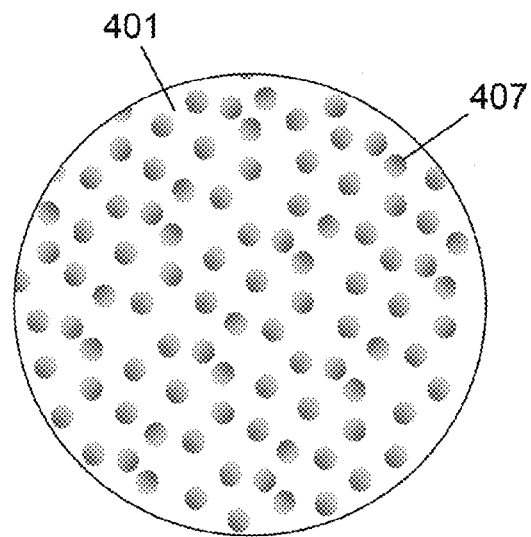
FIG. 5A is a top view of a film according to an embodiment of the present disclosure.
Figure 5B:
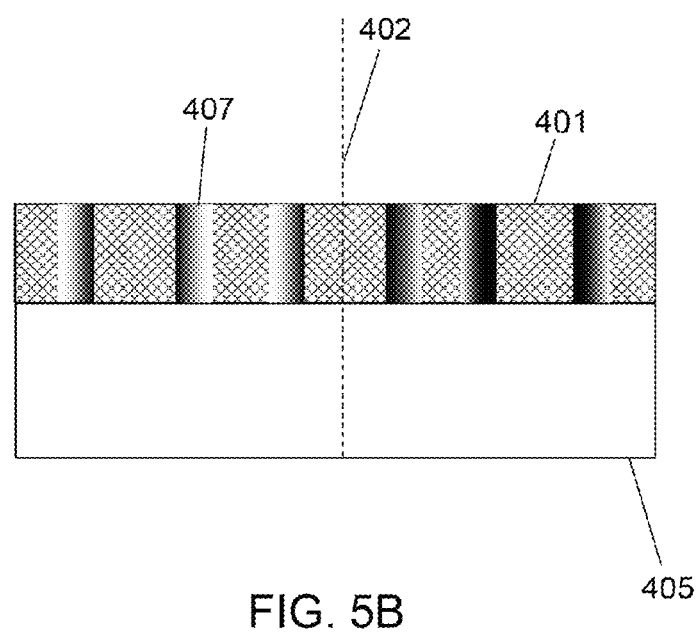
FIG. 5B is a cross-sectional view of a small portion of film of FIG. 5A applied an ophthalmic lens.

FIG. 5A shows a schematic top view of another film 401 according to an embodiment of the present disclosure. The film 401 comprises Bayfol® HX film and has been cut into a circular shape with an area of 500 mm². The film has a base refractive index, and a constant thickness. The film 401 includes a plurality of GRIN optical elements 407 that have been formed by photocuring, and that are distributed randomly across the film 401. Each GRIN optical element 407 has a circular cross section in the plane of the film, and a refractive index profile that varies asymmetrically in a circumferential direction. Several of the GRIN elements 407 have different asymmetric refractive index profiles. FIG. 5B shows a cross-section through a small portion of the film 401 of FIG. 5A, applied to a substrate 405 in the form of a contact lens 405. The GRIN optical elements 407 extend through the thickness of the film 401. The lens 405 is centred on an optical axis 402 that extends in a direction substantially perpendicular to the plane of the film 401. Light from an on-axis distant point source passing through a portion of the film 401 having the base refractive index will be focused to a spot on the optical axis 402. As the GRIN optical elements 407 have asymmetric refractive index profiles, the local optical axis of each GRIN element 407 is tilted relative to the optical axis 402 of the lens 405. As a result, light from an on-axis distant point source passing through each GRIN element 407 will be focused to an off-axis focal point. As different GRIN optical elements 407 have different asymmetric refractive index profiles, the local optical axes of the elements 407 may be tilted by different amounts, and the GRIN optical elements 407 may have different focal powers.

Figure 6:
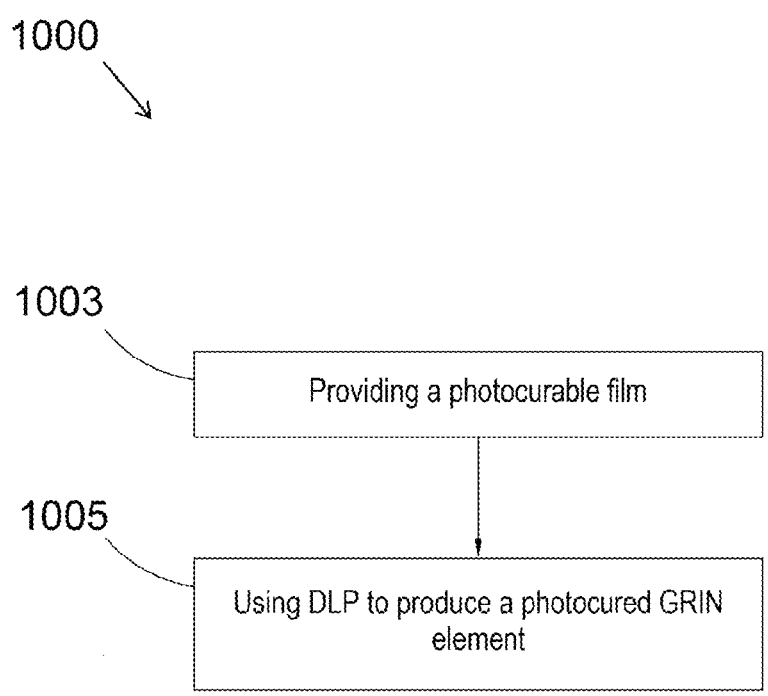
FIG. 6 is a flow chart showing a method of manufacturing a film, according to an embodiment of the present disclosure.

FIG. 6 is a flow chart showing a method 1000 of manufacturing a film according to an embodiment of the present disclosure. In a first step 1003, a photocurable film is provided. In a second step, 1005, a digital light projection system is used to photocure at least one region of the film, thereby producing at least one photocured gradient index optical element having an asymmetric refractive index profile.

Whilst the present disclosure has been described and illustrated with reference to particular example embodiments, it will be appreciated by those of ordinary skill in the art that the disclosure lends itself to many different variations not specifically illustrated herein. By way of example only, certain possible variations will now be described.

In example embodiments of the present disclosure described above, each GRIN element has a refractive index profile that results in a higher focal power than the base refractive index of the lens. In other example embodiments, GRIN elements may have a refractive index profile that results in a lower focal power than the base refractive index of the lens.

Whilst in the foregoing description, integers or elements are mentioned which have known obvious or foreseeable equivalents, then such equivalents are herein incorporated as if individually set forth. Reference should be made to the claims for determining the true scope of the present disclosure, which should be construed as to encompass any such equivalents. It will also be appreciated by the reader that integers or features of the disclosure that are described as advantageous, convenient or the like are optional, and do not limit the scope of the independent claims. Moreover, it is to be understood that such optional integers or features, whilst of possible benefit in some embodiments of the disclosure, may not be desirable and may therefore be absent in other embodiments.

The invention claimed is:

1. A film for applying to an ophthalmic lens, wherein the film has a base refractive index and includes at least one gradient index optical element having an asymmetric refractive index profile, wherein the film is configurable on a surface of a lens, such that light from a distant point source on the optical axis of the lens that passes through a region of the film having the base refractive index is focused towards a point on the optical axis of the lens, and light from a distant point source on the optical axis of the lens that passes through the at least one gradient index optical element is focused towards a point that is a first distance from the optical axis.

2. The film according to claim 1, including a plurality of the gradient index optical elements distributed randomly across the film.

3. The film according to claim 1, wherein at least two of the gradient index optical elements have the same asymmetric refractive index profile.

4. The film according to claim 1, wherein at least two of the gradient index optical elements have different asymmetric refractive index profiles.

5. The film according to claim 2, said film including a plurality of gradient index optical elements arranged to form at least one annular ring, wherein the at least one annular ring is centred on a film axis that extends in a direction substantially perpendicular to the plane of the film.

6. The film according to claim 5, including a plurality of gradient index optical elements arranged to form at least two concentric annular rings, wherein the concentric annular rings are centred on the film axis.

7. The film according to claim 5, wherein gradient index optical elements that form part of the same annular ring have the same refractive index profile.

8. The film according to claim 1, wherein gradient index optical elements forming a first annular ring have a first refractive index profile gradient index optical elements forming a second concentric annular ring have a second, different refractive index profile.

9. The film according to claim 1, wherein each of the at least one gradient index optical elements has a diameter or width of between 1 µm and 5 mm.

10. The film according to claim 1, wherein the gradient index optical elements occupy between 20% and 80% of a surface area of the film.

11. The film according to claim 1, wherein the film is a photopolymer film, and wherein each of the at least one gradient index optical elements is a photocured gradient index optical element.

12. The film according to claim 1, wherein each of the at least one gradient index optical elements has a refractive index profile defined by an asymmetric polynomial function.

13. The film according to claim 1, the film having a thickness of between 1 µm and 70 µm.

14. The film according to claim 1, further comprising an adhesive surface for adhering the film to a surface of an ophthalmic lens.

15. The film according to claim 1, further comprising a substrate configured to provide a protective layer when the film is applied to a surface of an ophthalmic lens.

16. The film according to claim 1, said film further comprising at least one annular ring of gradient index optical elements, wherein the film is configurable on a surface of a lens such that light from a distant point source on the optical axis of the lens that passes through a region of the film having the base refractive index is focused towards a point on the optical axis of the lens, and light from a distant point source on the optical axis of the lens that passes through the at least one annular ring of gradient index optical elements forms an annular ring of focal points at a focal surface.

17. An ophthalmic lens including the film of claim 1.

18. The ophthalmic lens of claim 17, said ophthalmic lens is a spectacle lens.

19. The ophthalmic lens of claim 17, said ophthalmic lens is a contact lens.

20. Spectacles comprising the ophthalmic lens of claim 17.

21. A method of manufacturing the film according to claim 1, the method comprising:
   providing a photocurable film; and
   using a digital light projection system to photocure at least one region of the film, thereby producing at least one photocured gradient index optical element having an asymmetric refractive index profile.

* * * * *